(12) United States Patent
Thrasher

(10) Patent No.: US 7,797,299 B2
(45) Date of Patent: Sep. 14, 2010

(54) SEARCHING DATA STORAGE SYSTEMS AND DEVICES

(76) Inventor: Steven Thrasher, 391 Sandhill Dr., Richardson, TX (US) 75080

( * ) Notice: Subject to any disclaimer, the term of this patent is extended or adjusted under 35 U.S.C. 154(b) by 45 days.

(21) Appl. No.: 11/479,563

(22) Filed: Jun. 30, 2006

(65) Prior Publication Data

US 2007/0005590 A1 Jan. 4, 2007

Related U.S. Application Data

(60) Provisional application No. 60/696,180, filed on Jul. 2, 2005, provisional application No. 60/712,191, filed on Aug. 28, 2005.

(51) Int. Cl.
*G06F 7/00* (2006.01)
(52) U.S. Cl. .................. 707/706; 707/748; 707/723
(58) Field of Classification Search .................. None
See application file for complete search history.

(56) References Cited

U.S. PATENT DOCUMENTS

| | | | |
|---|---|---|---|
| 5,875,446 A | | 2/1999 | Brown et al. |
| 6,138,128 A | * | 10/2000 | Perkowitz et al. ............ 715/205 |
| 6,643,641 B1 | * | 11/2003 | Snyder ............................ 707/4 |
| 2002/0103809 A1 | | 8/2002 | Starzl et al. |
| 2003/0014399 A1 | | 1/2003 | Hansen et al. |
| 2005/0091209 A1 | | 4/2005 | Frank et al. |
| 2005/0114324 A1 | | 5/2005 | Mayer |
| 2006/0136377 A1 | * | 6/2006 | Patt-Shamir et al. ............ 707/3 |
| 2006/0259462 A1 | * | 11/2006 | Timmons ......................... 707/3 |
| 2009/0037355 A1 | * | 2/2009 | Brave et al. .................... 706/45 |

OTHER PUBLICATIONS

U.S. Appl. No. 10/990,588, filed Apr. 28, 2005, John Frank.
U.S. Appl. No. 10/939,454, filed May 26, 2005, Yaron Mayer.
Soo Young Rieh, "Judgement of Information Quality & Cognitive Authority In The Web", Journal of the American Society for Information Science & Technology 2002, pp. 145-161.

* cited by examiner

*Primary Examiner*—Apu M Mofiz
*Assistant Examiner*—Thu Nga Nguyen

(57) ABSTRACT

The invention teaches systems, methods and devices for searching data storage systems and devices. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

2 Claims, 13 Drawing Sheets

---

System Learns & Dynamically Scores (Seperate Display)

| Search Results | Score |
|---|---|
| A. 1,2,3,4,5 | (95) |
| B. 1,2,4,5 | (94) |
| C. 1,2,3,5,6 | (94) |
| D. 3,4,5 | (92) |

User Selects B, ------- (3 unimportant)

| New Scores | Score |
|---|---|
| A. _____ | (92) |
| B. _____ | (99) |
| C. _____ | (80) |
| D. _____ | (82) |

Table 1

Low Assistance
→ Level 1 Synomyn
+ Avian
+ Shop
+ Parrot
Mid Assistance
+ Pet
High Assistance
Dallas TX => Plano, Richardson
              Frisco, Arlington

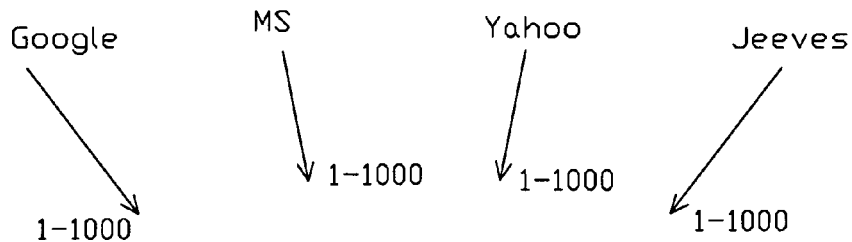
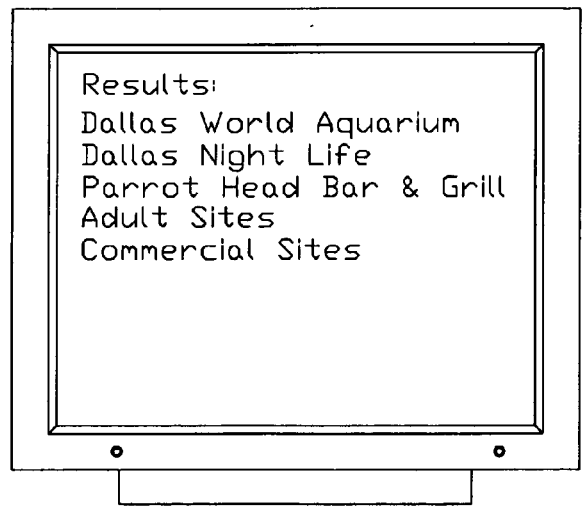
FIG 2
Table 2
User Filters (Not)
- Travel Sites
- Adult Sites
- CC Entry Sites
System Filters
- Identicaal "Core" Sites (same home) & Repetitions
- "Dead" Sites (1 + yr inactive)

- Attorneys (including types)
- Kids (grade levels)
- CPA
- Industry (professional) etc.
- Topical (zoo, animals, history, history, books, travel, etc.)

Table 3

① Specific Filters
② Word Scoring of synonyms
③ Scoring of Results ex) a) "Patent No 6,000,000" Search
           the actual Patent is sent to the top.

b) Cases about the patent are next.

FIG 4

System Learns & Dynamically Scores (Seperate Display)

| Search Results | Score |
|---|---|
| A. 1,2,3,4,5 | (95) |
| B. 1,2,4,5 | (94) |
| C. 1,2,3,5,6 | (94) |
| D. 3,4,5 | (92) |

User Selects B, -------    (3 unimportant)

| New Scores | Score |
|---|---|
| A. | (92) |
| B. | (99) |
| C. | (80) |
| D. | (82) |

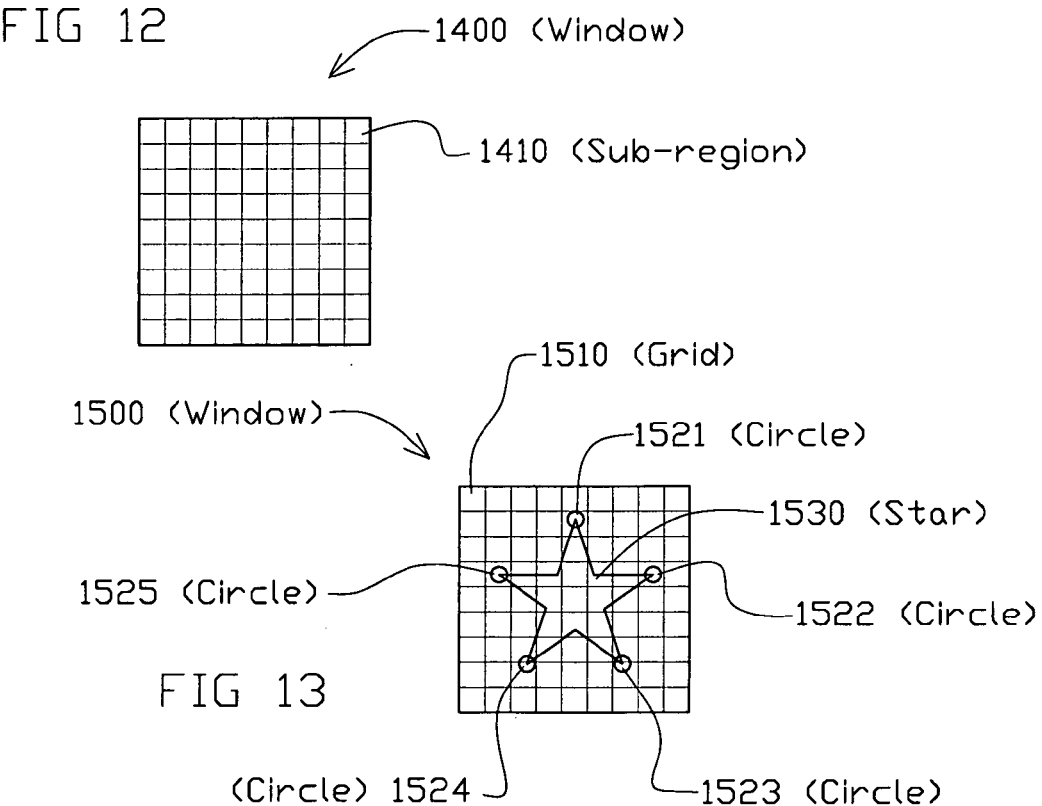
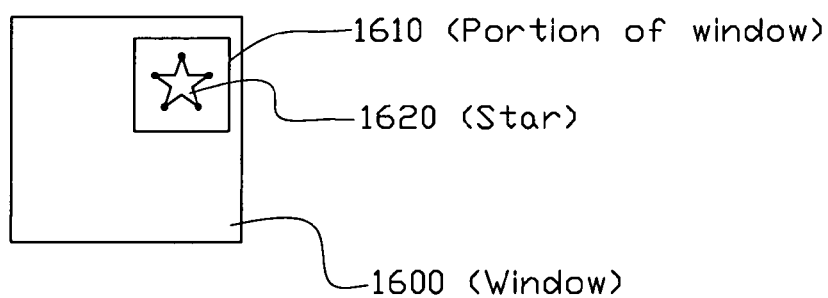

SEARCHING DATA STORAGE SYSTEMS AND DEVICES

CROSS REFERENCE TO RELATED APPLICATIONS

The invention is related to an claims priority from U.S. Provisional patent applications No. 60/696,180 filed 2 Jul. 2005, and 60/712,191 filed 28 Aug. 2005, both to Thrasher, Steven, and both titled SYSTEM, METHOD, AND DEVICES FOR SEARCHING DATA STORAGE SYSTEMS AND DEVICES.

TECHNICAL FIELD OF THE INVENTION

The invention relates generally to data storage systems and devices.

STATEMENT OF A PROBLEM, ADDRESSED BY THIS INVENTION

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

Database searching is big business. For example, information maintained on the internet is often located with an "internet search." An internet search can be characterized as a search of a database of internet content maintained by an internet search engine. In the late 1990's through early 2000's the internet experienced an explosion of searches from users of all backgrounds. Typically, search engines search internet pages that have been "indexed," often at a price to those who wish to have their pages indexed. Then, when a user searches for words that happen to be associated with that page, the search engine "scores" that indexed page relative to the searched terms, based on the types of words found, frequency of words found, and other methods. Then, search results are displayed for the user typically in an order based on the "score", where it is widely assumed that the score indicates search results most relevant to that user. However, internet search engines have more recently begun ranking and displaying results that are "unnaturally" influenced by web page owners "buying" higher ranking directly from the search engine, or the web page owner purchasing page ranking services from third parties, called "optimization", or both. Thus, instead of finding the most relevant results, the user of the search engine views results that mostly reflect advertising budgets.

For example, a person searching for a metro transit map of Athens, Greece may enter words into a search engine line such as "Athens Greece Metro". One might expect such a search to produce maps of the metro of Athens, Greece. However, more commonly such a search will result in voluminous pages of search results that are no more than advertisements from travel agencies. Accordingly, a user is besieged with an inundation of information that is practically useless to that user. Perhaps, after considerable searching into the search results (which may exceed millions of results), that user may indeed find a map of the Athens, Greece underground metro. More commonly, however, the user will leave a website frustrated that the desired search information was not found. In addition, the user is frustrated at both the search engine, as well as the providers of the information which he or she views more or less as information noise.

Accordingly, search engines such as Yahoo®, Google®, Ask Jeeves®, A9®, Microsoft®, and the like would benefit from systems, methods, and devices that enable a user to access the information they are genuinely searching for. The present invention provides such systems, methods, and devices.

BRIEF DESCRIPTION OF THE DRAWINGS

Various aspects of the invention, as well as an embodiment, are better understood by reference to the following detailed description. To better understand the invention, the detailed description should be read in conjunction with the drawings in which:

FIG. 2 illustrates an aspect that produces better search results.

FIG. 4 illustrates activity of an intelligent system that learns and dynamically scores searches and search results.

FIG. 12 illustrates a graph used in a pass picture.

FIG. 13 shows a pass picture graph superimposed upon a picture of a pass picture.

FIG. 14 demonstrates that a pass picture may comprise a portion of a display screen.

EXEMPLARY EMBODIMENT

Interpretation Considerations

Figure 1:
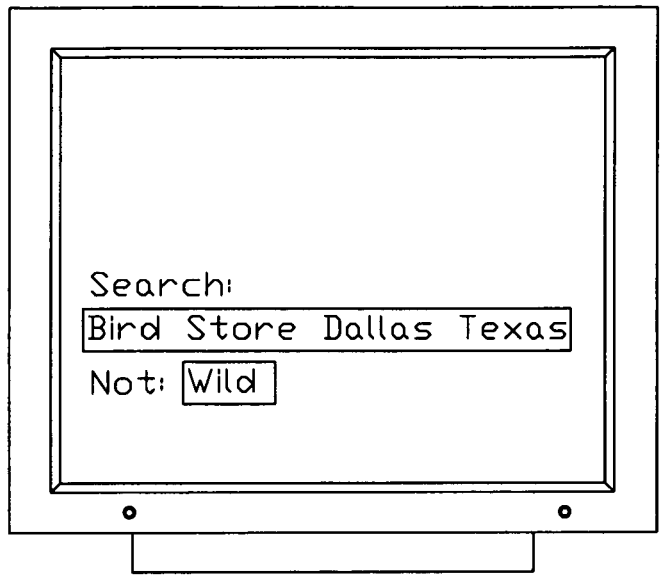
FIG. 1 illustrates an aspect of a better search.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for -functioning-" or "step for -functioning-" in the Claims section. Sixth, the invention is also described in view of the Festo decisions, and, in that regard, the specification, claims and the invention incorporate equivalents known, unknown, foreseeable, and unforeseeable. Seventh, the language and each word used in the invention should be given the ordinary interpretation of the language and the word, unless indicated otherwise.

Some methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Data elements are organizations of data. One data element could be a simple electric signal placed on a data cable. One common and more sophisticated data element is called a packet. Other data elements could include packets with additional headers/footers/flags. Data signals comprise data, and are carried across transmission mediums and store and transport various data structures, and, thus, may be used to transport the invention. It should be noted in the following discussion that acts with like names are performed in like manners, unless otherwise stated.

Of course, the foregoing discussions and definitions are provided for clarification purposes and are not limiting. Words and phrases are to be given their ordinary plain meaning unless indicated otherwise.

DESCRIPTION OF THE DRAWINGS

Although the invention is described with specific reference to search engines, it is appreciated by those of skill in the art that the teachings of the invention incorporate searching any database. Accordingly, the readings of the invention are not limited to the internet environment. The better search of FIG. 1 incorporates a user interface displayed on a graphical user interface, operatable on an internet, intranet, an individual computer such as a desktop, laptop, hand-held computer, smart phone, super computer, and the like, operable upon any operating system including those available from Micrososft® such as Windows®, those available from Apple® such as the MacOS®, Linux®, Sun®, Unix® or any other operating system. One preferred user interface is a standard data entry line into which or upon which a user may type words for searching as is known in the art. Alternatively, a user may operate via voice-activated systems such as the user speaks a word, that word is then part of a search query. Similarly, a "not" search exclusion window is provided. Words typed into the "not window" are used to build a filter that either removes or negatively influences the scoring of a search result. Furthermore, in an alternative embodiment, icons can be dropped or selected to populate the search query. For example, a travel web page could have a search system whereby a user could "drag and drop" an icon of a plane, credit card, hotel, and the like into a search window and/or not window. These icons, in combination with an interactive calendar and a user profile enables a user to make travel reservations while typing mush less text information, and perhaps without actually having to type any text information. In one embodiment, the system and method operates upon a single computer enabling the computer to function as a specific computing device which then accesses information via the internet or upon that specific computing platform. However, in other embodiments, the user interfaces provide remotely via an application service provider, or other method of remote data entry, including remote voice activated data entry, such as available via cell phones, smart phones, or other mobile computing devices. Further, in one embodiment the user interfaces customizable. For example, a user may wish to designate a specific type of data entry system by designing or defining user-selected icons, and the user may designate a location of the search window, not window or any selected icon which itself may be associated with any information, including a word, text, picture, hyperlink, and the like. The invention may also dynamically query a user and/or display information for that user based on information learned by the system.

Optionally, in reference to Table 1, the search includes a means for word association and scoring, such as may be achievable via a thesaurus driven system. For example, a search of "Athens Greece metro" may be via a thesaurus include other words associated with Athens, Greece, and/or metro. For example, Greece may be associated with the word "Helenic" while the word metro may be associated with other words such as "underground" and "subway". Accordingly, according to one method of the invention, these additional thesaurus driven and produced words, although not entered by the user, are then included in the search terms so that more web pages similar to those for which the user is actually searching may be located. In addition, the use of a thesaurus may generate secondary in tertiary level synonyms. For example, the word subway may be associated via a thesaurus with the word "train." Similarly, the word Hellenic may be associated with the phrase "ancient history". Depending on the search system, which may be user defined, such secondary in tertiary search results may be included in the scope of the search. Furthermore, these secondary in tertiary search terms may have associated with them a scoring system. For example, the scoring system may give those words that the user enters manually or verbally a relative value of one, while secondary terms associated via the thesaurus may be given an associated value of 80% or 0.8 the value of the original search terms, while those terms that are tertiary may be given a scoring value of 30% or 0.3 data the primary search terms entered by user. Of course, the value associated with secondary and tertiary or fourth level or fifth level etc., search terms may be intelligently selected by a user or programmer to provide more affective and relevant search results for a user, and may be dynamically associated and/or dependent upon the number of searches terms used, and/or the sophistication of the word entered and/or the number of associated synonyms at each level.

By way of an alternative example, suppose one enters the search terms "bird store Dallas Tex." The terms bird and store and Dallas and Texas may be assigned a search value of 100% or 1. In addition, should one associate synonyms with these words such as are available via the Microsoft® Word® thesaurus, one would find level one synonyms for bird includes terms such as "avian" and "parrot", while level one synonyms for the word store include the word "shop". Tertiary synonyms include words such as "pet" which are associated as synonyms with the word parrot. At this point it will be beneficial to the reader to also understand that antonyms may be used in a like manner. For example, the word underground is an antonym of the word or phrase above ground. Accordingly, in one embodiment, the system, method, and/or device knows to associate words that are clear and distinct anonyms of search terms with negative search values. For example, metro is associated with the synonym underground and subway. Accordingly, the invention then recognizes alternative forms of transportation as antonyms such that airplane, bus, and/or its synonym tube, and automobile may be negatively associated with the word subway. Accordingly, search results having these additional antonym terms may be assigned a negative value, such as negative 10% or negative 0.1 or any other value defined in a search engine algorithm or by a user of a search engine. Of course, the clarity of the antonym as being against the desired search results may produce more negative weight being assigned to that antonym.

Accordingly, in one embodiment, the invention of provides a high degree of assistance and intelligence to the search process such that the search engine being used whether proprietary to the invention, or incorporating one or more of independent search engines such as is available through a software plug-in, generates and scores much more relevant results as are available through traditional search means.

Although the invention may be implemented as a standalone search engine, in one embodiment the invention runs as a search engine front-end that uses an independent (or third-party) search engine database and scoring system. For example, FIG. 2 indicates that search results may be provided by one or more search engines, including search engines that are both proprietary to the invention, as well as independent search engines that may be accessed independently or as part of a plug-in. Because some search engines regularly claim to return literally millions of relevant results, in one embodiment, not all search results are produced for a user. For example, a pre-determined number of search results (such as 1,000) may be provided by a single search engine such as Google®, or from all available search engines that are part of the search results. For example, the invention may pull the first 1,000 search results from Google®, the first 1,000 search results from Microsoft®, the first 1,000 search results from Yahoo®, and the first 1,000 search results from Ask Jeeves® (although search engines independently index web pages, the scoring system vary so widely that it is quite rare to see significant overlap, much less unity, across the first thousand search results from any two search engines). To continue the example incorporating the search results for "bird store Dallas Tex.", one might find that search results include the Dallas World Aquarium, Dallas Nightlife, the Parrot Head Bar & Grill, and adult sights such as "The Mens Club of Dallas", and commercial sights which are often identifiable because they request credit card entry and require encryption. Accordingly, by taking the top 1000 results from each of four search engines (for a total of 4,000 results), the most highly relevant results are produced for evaluation. These results may then be stored (or "cashed") for independent scoring and/or filtering according to the invention. Referring to Table 2, for example, a user may instruct that "travel" sights are not important via the "not" window or other means known in the art or foreseeable. Thus, the user who searched for "Athens Greece Metro" may eliminate travel sights from the search results. Similarly, concerned parents may eliminate adult sights from all searches and concerned parents as well as parents with children in college may eliminate credit card entry sites from all search results so that credit card information may not be provided through their computing platform. Accordingly, it is understood that the use of the "not window" may result in filter terms that are either permanent, stored, situational, search specific, and the like. In addition, the invention may provide filters that eliminate identical search results including web pages, and in one embodiment may eliminate identical source sites meaning that this invention may eliminate "sub pages" having the same home page such that only the home page or the most relevant sub page is given preferential treatment in the search results. Alternatively, such sub pages and associated home pages may be grouped, clustered, or otherwise associated with each other in the search results. Thus, this system, in one aspect, avoids repetitious listing of identical information. In addition, the invention may eliminate "dead" sites, and sites that have been inactive for a pre-determined period of time or more (such as one (1) year). Of course, the filters discussed above are exemplary and other filters are easily identifiable to one of ordinary skill in the art upon reading the present disclosure.

Figure 3:
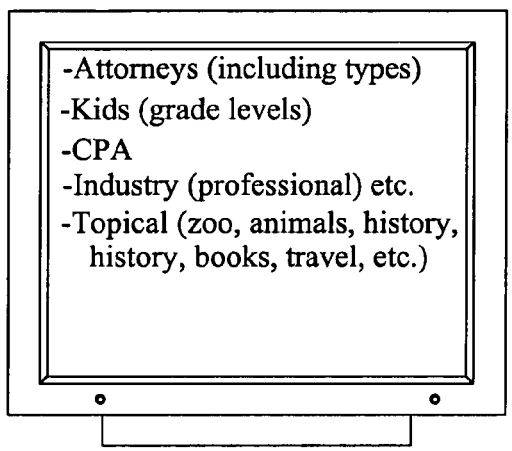
FIG. 3 illustrates an aspect of focused searching, which includes core-searching.

In reference now to FIG. 3, from one aspect is sometimes called core searching, meaning that the collection of synonyms and antonyms and scoring provide for user-specific search products. For example, attorneys, kids, a certified public accountant, (CPA), industry, or topic-specific products may be provided. Further, sub categories may be independently pursued as products. For example, attorney products may include products for Patent Attorneys, Litigators, Estate Planning, or other specific attorney functions. In addition, kid-specific programs and products may be available and sub-divided via grade level, achievement level, child interests, child specific programming such as available via television or the internet, or other sub-division desired in the educational or child specific arts. Certified public accounting may be sub-divided into type of accounting such industrial accounting, utility accounting, legal accounting, or otherwise. Likewise, industries may be sub-divided into air-conditioning, import/export, lighting, for example. Furthermore, topical search systems and products are nearly limitless and include topical categories such as zoos, animals, history (or sub-divisions of history, such as ancient history and/or civil war history, and/or ancient history including Egyptian history, and Greek history, Hittite history, Persian history, for example, books, travel, for example). Accordingly, core searching programs and products and processes may utilize synonyms, antonyms, and filters, which in turn themselves may utilize antonyms as well as synonyms. For example, particular search terms and synonyms may be given much higher relevance when a program or product for a patent attorney is used to search for a patent relevant results. For example, with reference to Table 3, if when using the a patent attorney topical search system, a user searches for Patent No. 6,000,000, then the actual patent number 6,000,000 appears as the top search result, while cases regarding that patent appear secondary, and articles and journals regarding that patent appear tertiary, and so on. Of course, the order of a search result sub-category may be dependent upon a specific core search program, and may be definable by the user who creates that topical category (or "theme"). The search results for a product or program for patent attorneys may filter those items and search results which may likely be produced as an outcome of a search having search results that are payment dependent. For example, a patent attorney topical category will likely heavily filter travel sites, internet gaming sites, adult sites, and other sites of low relevance to patent attorneys. Thus, a patent attorney searching for Patent No. 6,000,000 is actually likely to get has his first or her first search result Patent No. 6,000,000, while someone who is searching for a bird store in Dallas Tex. is more likely to actually get a bird store in Dallas Tex. and not some other undesirable listing of web pages. In other words, the user actually gets the search results that most likely contain the information that they are looking for.

FIG. 4 incorporates another feature of the invention—that the invention learns, and automatically dynamically scores search results (although it is appreciated that the user may direct the invention to display the scored results after each selection, after any number of selections, over time, or upon actively selecting a refresh action). For example, presume that a user enters a search for five words, which here are just identified as word 1 ("1"), word 2 ("2"), word 3 ("3"), word 4 ("4"), and word 5 ("5"). The search engine may then generate results and display results a through d, such that result a is ranked highest since it has all five search results, result d is ranked second highest and is scored the same as result c, while search result d is ranked less because it contains less relevant search results (being three of the searched words). Assume, as shown in FIG. 4, that a user selects to look more closely at search result b. Presumably, since the user selected result b over search result a, the word in result a not part of search result b must be of less importance to the user. Thus, the third (or result c) search term is assigned a lower relevance and search score in the search process and results process. Accordingly, a user may choose to re-sort the search results, and when this is done, a revised listing with revised scores are displayed for the user such that in this example a lower score may actually appear next to a higher ordered search result. Then, a user may click or select a score header or some other icon such that the order of the displayed results are re-listed. Accordingly, the new search results may be displayed in orders b, a, d, c. Accordingly, such a system allows a user to more quickly view more relevant results for that user. Alternatively, a user's selections may saved either automatically or by that user, perhaps using specific search criteria indicators or search result names, such that future search results may incorporate the modified scoring implemented by the invention in that dynamic search scoring system shown in FIG. 4. Of course, other results, including predictive results analogous to those used in the predictive dialing telecommunications industry are applicable to the present invention and to the present discussion and are incorporated herein by reference for all terms known and unknown, foreseeable and unforeseeable.

Figure 5:
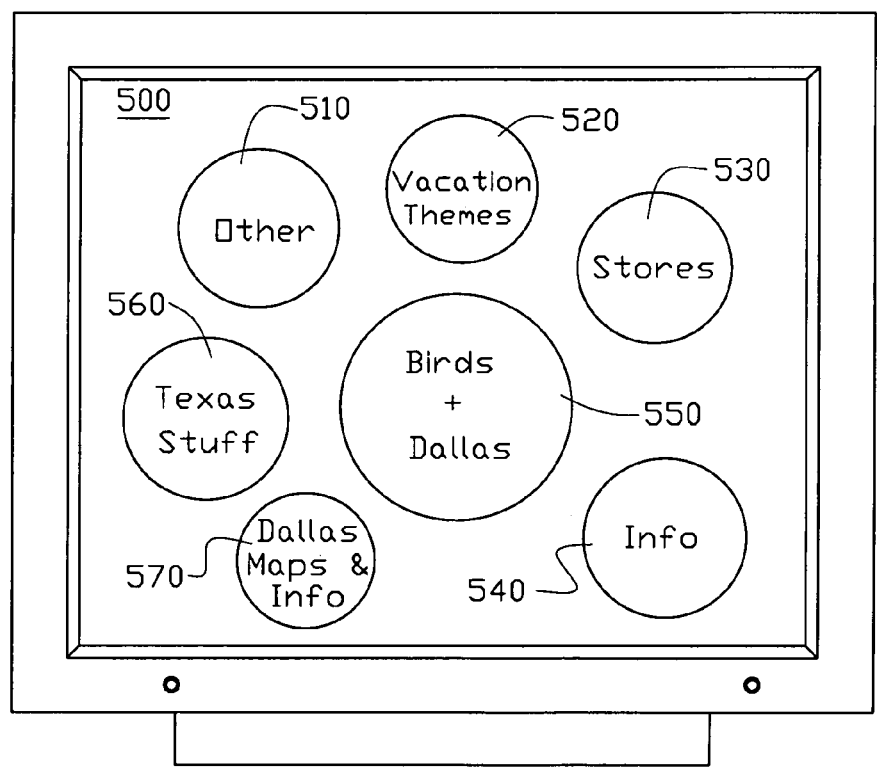
FIG. 5 illustrates a visual display of search results in a Venn diagram format.
Figure 6:
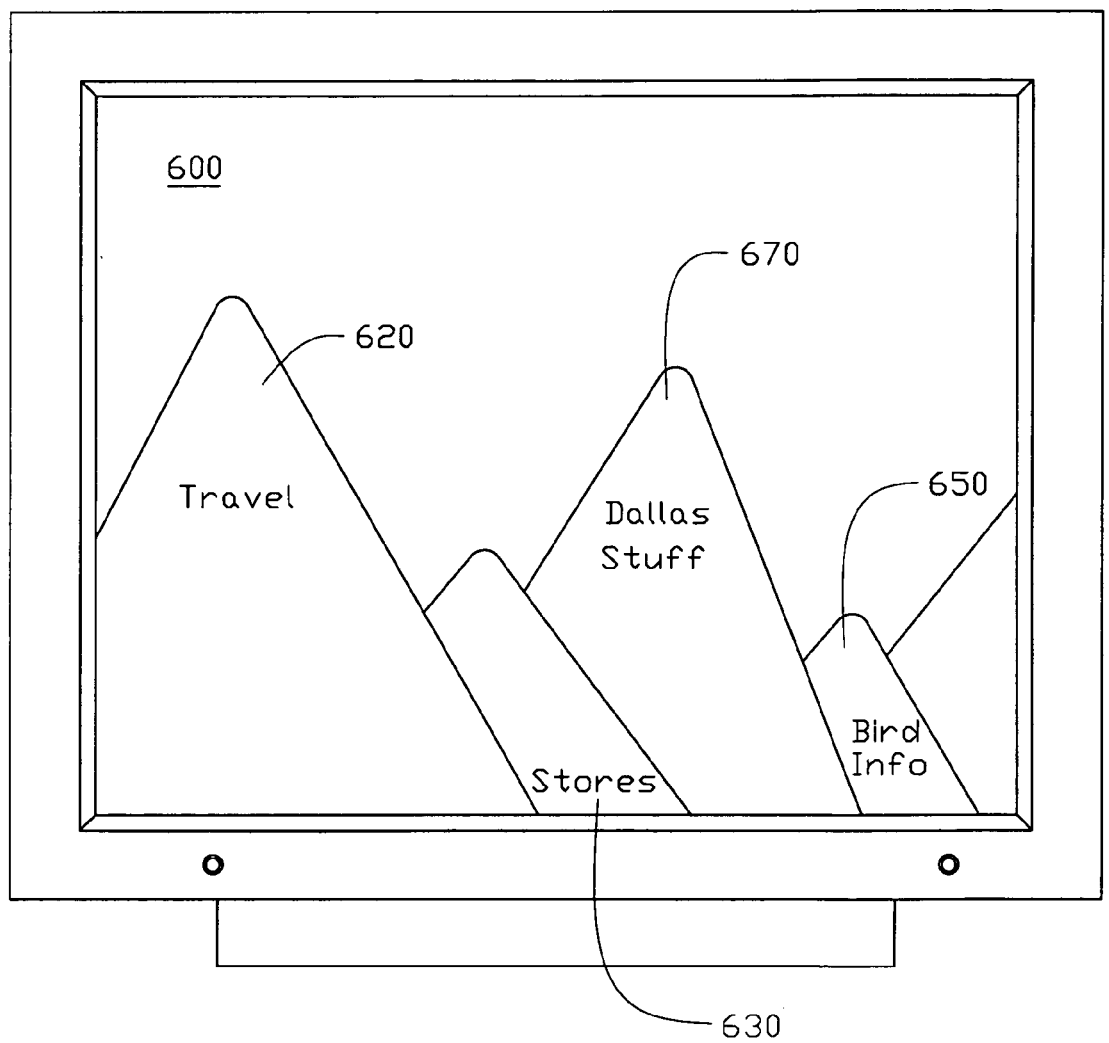
FIG. 6 illustrates a graphical display comprising an adapted Venn diagram illustrated as mountains.
Figure 7:
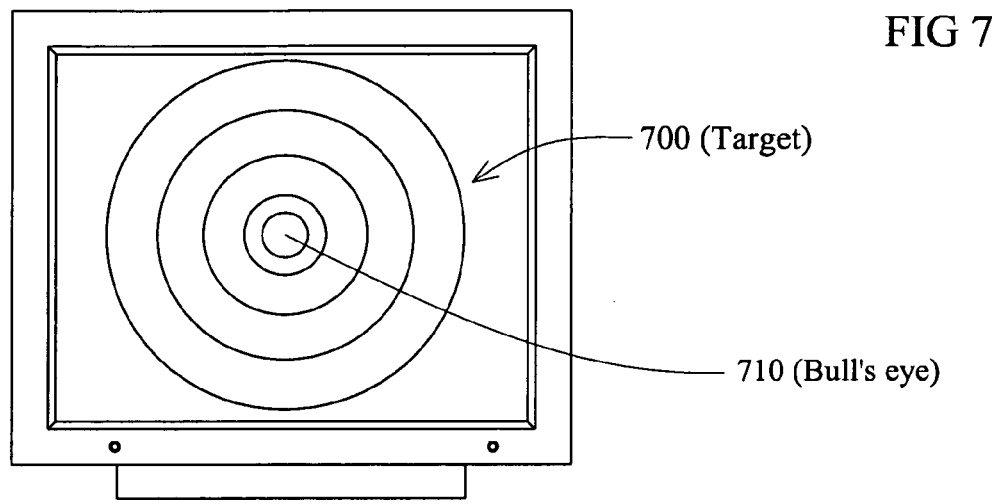
FIG. 7 illustrates a user display target.

The aspects illustrated in FIG. 5, FIG. 6, and FIG. 7 are graphical displays of search results and may be used for generating database code, such as SQL, to perform more detailed searching. For example, FIG. 5 illustrates search results in what may appear to be a planetary or clustered format. However, a traditional Venn diagram understood by those of ordinary skills of mathematical arts is a similarly usable interactive graphical display system. Thus, a user may more readily recognize groupings of similarly related search results, and may then select that grouping of search results graphically so that further more relevant search results may be explored either graphically or in a traditional list format. In FIG. 5, the results for Dallas Tex. Bird Store are displayed graphically on a graphical display 500 as non-intersecting planets 510-570. For example, one planet 520 may group web pages having a vacation theme, while another planet 570 may group Dallas Tex. related stuff such as maps and other information. In one embodiment, a single web page may actually be found as a result in one or more planet(s). Further, in a preferred embodiment, such planets would be shown overlapping in various configurations such that web pages having both Dallas maps and vacation themes, for example, would intersect such that if a user graphically, manually, or vocally selected the intersection point of the Dallas maps and info planet in the vacation themes planet 520 the user would quickly access those web pages having both Dallas maps and information and vacation themes in these pages most relevant to the search terms we have given the highest priority. Similarly, in the context of searching, the user, by selecting a region, rather than the intersection of the overlapping circles, may influence the "score" of the results such that the term(s) associated with the selected region are more highly scored, while the terms associated with an unselected region are neutral or "negatively" scored. In addition, "suggested" but unsearched terms may be dragged and dropped into the Venn diagram, which has the effect of making that term part of the search window (which may or may not be visible to the user). Similarly, search terms may be graphically removed from the search window by dragging and dropping them "off" the Venn diagram.

Figure 8:
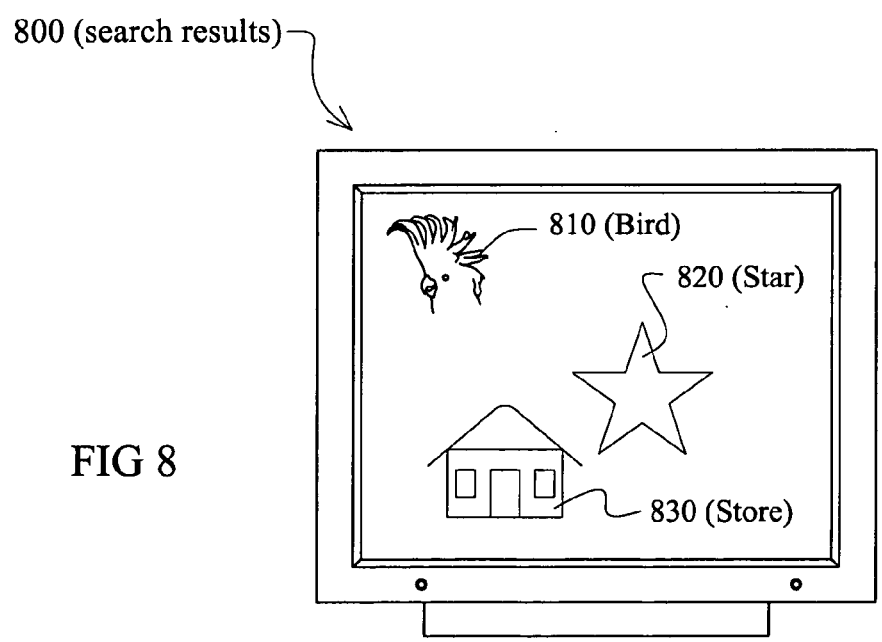
FIG. 8 illustrates a user display as icons.

By way of alternative example one may view FIG. 6. in which similar Venn diagram information is illustrated as intersecting mountains 620-670. Accordingly, a user may select the intersection of travel 620 and stores 630 and Dallas stuff 670 to search for stores specializing in Dallas merchandise for travelers. Similarly, one may select the intersection of bird information and Dallas stuff and stores to locate bird stores in Dallas. Thus, it is appreciated that any logical graphical formatting may be used to provide a user more easily usable and accessible information through the graphical displays of that information or related information, and the user interaction with that display. Likewise FIG. 7 shows another type of systems for displaying graphical information, illustrated as a target 700 having a bull's eye 710, which, upon a user-selection of a target circle, takes the user to results associated with terms articulated in the target 700. Such a display is advantageous where a search term produces results that comprise several sub-sets of increasing specificity. Likewise, search terms may successively "AND" towards the bull's eye 710, or those items not having all search terms are displayed in an order of predicted ascending relevancy. Similarly, other users may wish to associate icons with search results as shown in FIG. 8. For example, the search of bird store Dallas Tex. may provide search results 800 that could be clustered and illustrated as a bird 810, a Dallas star 820, a store 830, or an icon of the State of Texas. In addition, special relevance may be given to any icon or search result that the invention considers most relevant by flashing, bolding, highlighting or providing a distinctive sound such as when a user selects or rolls a cursor over an icon, or by providing that icon in a color as opposed to black and white format to emphasize some attribute of the search results in that category represented by that relevant icon.

In addition to logical grouping based on AND and OR relationships, other groupings are provided. For example, in addition to indexing and scoring a web page, individual terms and/or phrases may also be scored. Accordingly, a Venn diagram in one embodiment represents the grouping of quality terms. For example, on a travel web site, the term "flight" may be quite important and common, while on a web site about birds a "flight" may be far less important. Systems and methods of scoring individual terms are known in the art. Accordingly, the Venn diagramed results may show results that AND and OR sites using only the "most relevant" results scoring. For example, a first web page in the search of "Athens, Greece, metro, map" may have a score of 22 points, broken down into Athens=10, Greece=8, metro=1 and map=1, while a second web page may have a total score of 30, but omit what the user thinks is a critical search term. For example the second web page score may break down as Athens=10, Greece=0, metro=8, and map=12, perhaps because Greece is either abbreviated or misspelled. Some systems would completely filter such a site, while a pure Venn diagram may result in a display that makes the second term look as if it has a lower quality. However, if a display incorporates term scoring into the results, then "hot spots" and other visual indications of high scores can be used to guide a user to more relevant results. In addition, a user may select (or the invention may automatically select) a minimum relevance score. For example, a user may wish to only view those sites having a relevance score over 20, or over a percentage, such as 70%, or of some other scoring method known in the art, foreseeable or unforeseeable, known, or unknown.

Alternatively or in addition to the above, the invention may query the user to provide context for a search term—for example, if the user enters flight, the invention may inquire "Click one or more of the following desired relationships: flight is related to: birds, music, airplanes, speed, travel, FAA, and literature." Upon the appropriate user selection, the invention proceeds to produce the relevant results, and in one embodiment, such associations are displayed as "pie slices" in a Venn Diagram, or some other form of "sub-set" graphic.

Of course, upon reading this disclosure, it is readily apparent to those of skill in the computer arts that any graphical representation may provide similar information, in such systems of providing information are incorporated within the scope of the present invention. For example, travel destinations, castles, homes, people, animals, nature scenes, plants, weapons, music groups, musical instruments, pets, family members, companies, for example, may form a nexus or focal point that can be then interpreted into an icon or other graphical representation. Thus, these alternatives and all alternatives discussed in the present application are incorporated within the scope of the claims.

The present invention may be utilized for searching on a single computing platform or multiple network computing platforms rather than the Internet. In such an example, the users search criteria are utilized to quickly scan that hard drive or hard drives and other remote computing platforms for the desired information. Further, the icons may reflect search results. For example, a larger icon may be used to represent a greater quantity of search results, while a flashing icon may be used to represent a higher quality of search results. In addition, such roles may be reversed or additional methods and systems of calling particular attention to a particular icon may be utilized.

The practice of the invention, whether in its system, method, or device form, are readily apparent to those of ordinary skill in the programming and computer arts upon reading the present disclosure. In addition, methodologies (whether implemented as a computer program or other methodology), includes those sub-components of the methodology that are both new and novel as required by law.

In another aspect the invention may be practiced as a method that generates indexed and/or database search results. Although other points of view of the invention and all of its embodiments are practicable either online, from a user terminal, at a sever, across a network, or as a system, the present embodiment addresses a system-level point of view specifically. First, user inputs are received. The user inputs may be made manually, with a mouse, voice activated input, typed input, and/or may include historical based data. In one embodiment, the item being searched for is graphical in nature, such as an icon, photograph, other image or graphic. The data may be sub-divided into data components, such as words, and phrases and logical symbols and the like such as those known in the data base arts. Then, words are associated with each of the data sub-components. For example, each word may be associated with a synonym. In addition, an icon may be associated with words that are descriptive to that icon or some other third thing represented by that icon. For example, a United States National Flag may have associated therewith words such as President, United States, American History, Francis Scott Key, Star Spangled Banner, etc. These synonyms may be effectively added to the search query terms, and may be scored such that more desirable search results will be produced later in one embodiment of the process. In addition anonyms and filter words may be associated (negatively) with the data elements as well.

Then, a data storage system, such as an indexed Internet search database, is accessed to provide results to the query. For example, the invention may access a system such as Google®, or an internal proprietary system. Then, a selected number of highest priority search results are obtained and bundled and then internally filtered by the invention. Accordingly, if multiple data storage systems, such as databases used by Internet search engines are accessed, a pre-determined number of results, such as 1,000 may be obtained from each of the data sources. Alternatively, of course, all search result may be obtained from a single data source. Thus if four data sources are searched and 1,000 results obtained from each data source for a total of 4,000 results, those 4,000 results are then filtered via smart content filters to remove sites that received preferential treatment because of advertising, adult content, credit card entry, or repetitive sites, for example. Thus the 4,000 search results will be pared down to less than 4,000 search results and probably much less than 4,000 search results.

Then, when a core-searching product is used, pre-defined associations of synonyms and disassociations of antonyms and filters are used to provide content that is predicted to be more relevant and most relevant to the user based on the core-searching product. Alternatively, the core searching products may implement core searching before or after the results are obtained. For example, core searching may apply synonyms prior to the access of the data storage systems via synonyms, for example, and may apply filtering whether or apart from the filtering act once results are obtained from the data storage systems.

In one embodiment, the invention learns user preferences and dynamically scores search results as discussed above or in other manners known in the art or equivalence foreseeable or unforeseeable including all equivalent known or unknown in the art. Then, the system displays the search results graphically to a user. The graphical representations may take the form of a Venn diagram, Venn diagrams equivalents, icons, or other user preference icons or images that may or may not have a relation with the search results. As icons are selected the terms associated with those icons are scored more highly in that anomic scoring system. In addition, as icons are selected additional details of that related information becomes visible. For example, search terms entered by the user may be available at the first graphical display of information and search results, while synonyms may appear once that search result is selected. Then, as additional "diving down" enters the information is pursued by the user, the synonyms, antonyms, icons, and other data representations intelligently tie the search results to the users search terms in a usable and visual manner. Of course, the present invention may be used to search not only remotely accessible data sources, but also personal computer, smart phone, personal digital assistant, cell phone or any device upon which a data query may be made.

Figure 9:
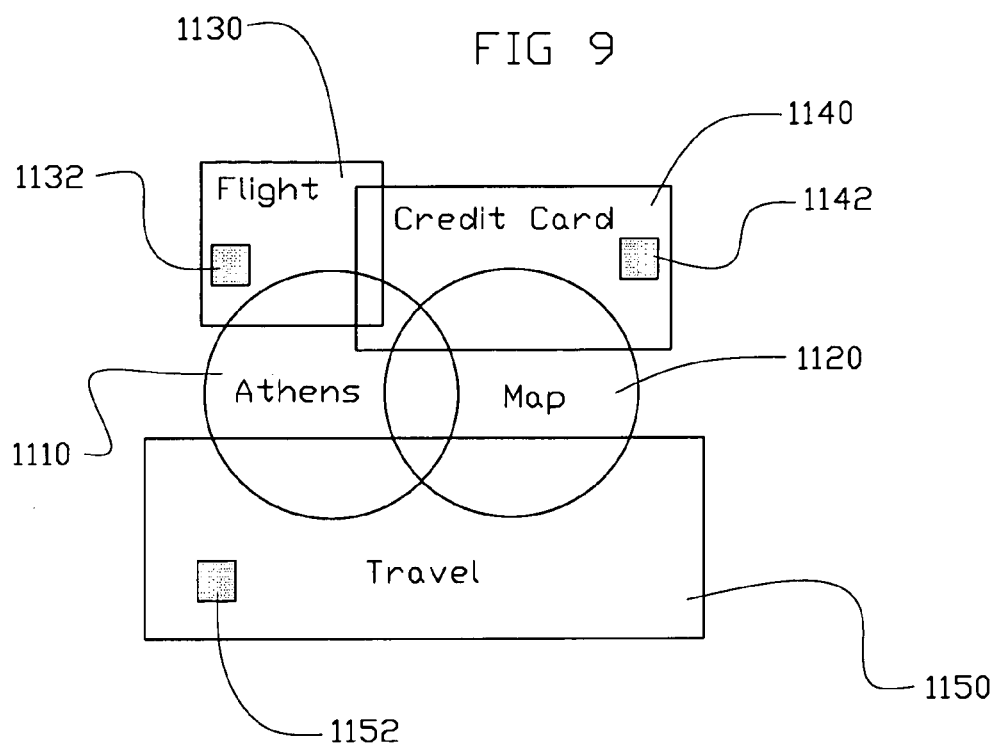
FIG. 9 shows an interactive Venn diagram of search results.

FIG. 9 is an exemplary Venn diagram illustrating enhanced search results. In FIG. 9 search results as illustrated based on a user who enters the search terms "Athens" and "map" as a search query (query). As may be similar to the previous discussion, a Venn diagram here illustrates the union and intersection of the sets Athens 110 and map 1120, and are produced as search results of the query. Of course, graphical word associations may also be entered, as discussed above. In addition to the search results generated for the search terms Athens and map, the invention provides additional intelligence to identify other words and or phrases that are common to the search results.

For example, the search terms Athens and map produce search results that, in addition to including at least one of the search terms, include flight schedules, travel opportunities, tour groups, and a number of web sites that accept credit cards, for example. These associated terms, whether words, text, images, links, enhanced words, icons, or URLs, for example, may also be expressed graphically in a Venn diagram automatically. For example, the associated terms are easily identified because their sets are illustrated as a geometric shape (here, polygons 1130, 1140, 1150) different from the geometric shape used to provide search result information for the user entered search terms (here, circles 1110, 1120). However, it should be understood that these associated terms may be illustrated as similar shapes to the shape that is used to provide the query word information back to the user (such as all circles), may be illustrated as slices or chunks of the queried terms results, and may or may not be further related to one another, such as polygons or ovals, for example (ovals may contain words more related to the search terms, such as synonyms, than, say, a polygon). Thus, as words are related as synonyms or unrelated as antonyms, these relations may be graphically illustrated by using shapes, images or other indicia that are preferably correspondingly similar or dissimilar to each other.

In addition, not all associations are illustrated with a one-to-one correspondence to the search results. This means that associations may be illustrated in a manner that facilitates user viewing, rather than shows the actual volume of correspondence, or even actual relationships. This prevents "cluttering" when a very high correspondence rate is found, such as when two or more searched terms are found in 95% of each other's sites. In such a situation, advantages can be gained by articulating the correspondence rates, such as percentages or numbers of actual sites, in a second location, such as a separate box that corresponds to a legend of a map. For example, a query of the words Athens and map produces a number of sites that include the search term flight, and a number of these sites accept credit cards. The union of the flight polygon 1130 having flight sites and the credit card polygon 1140 having sites that accept credit cards is illustrated in FIG. 9. Since most travel agency sites likely also accept credit cards one would expect there to be near-union with the polygons 1130 and 1140. However, the user is rather presented the information in a manner that is easily understood, rather than in a manner that demonstrates the logical overlap between the associated terms (or search terms). Thus, the union of a travel vacation web site with the credit card entry site is not a relationship that is forced into the information provided to the user, in this example, but the user can nevertheless easily identify the union location and easily select that overlap for further searching (diving down).

In one embodiment, an advertiser may pay a fee for a relationship to be illustrated in a manner that is advantageous to the advertiser, particularly in relationships where additional information is not necessarily critical to the user (such as a travel agency being associated with a geographical information). Additionally, FIG. 9 illustrates that the set information that is illustrated may itself convey advertising information to the user. For example, the travel set may be illustrated as a Delta® logo or watermark, the credit card entries set may be illustrated as a Visa® credit card logo or watermark, and the flight set may be illustrated as a Southwest Airlines® logo or watermark. Preferably, a user may directly access the advertiser sites by selecting dedicated a "quick link" which is illustrated as a small square (1132, 1142, 1152) within each of the additional information (square) sets and which takes a user directly to a page directed by the advertiser, such as the advertiser's home page or other page that is user-directed, for example. Further, advertising may be displayed based on a known user-profile. For example, Delta in 2005 has relatively few gates in Dallas, but many in Atlanta. The situation is reversed for American Airlines. Accordingly, a user-profile may drive American Airlines advertising to a viewer searching in Dallas, while the exact same query by a user in Atlanta would drive Delta advertising to that viewer. Similar advertising deliver based on user profiles and usage patterns are similarly provided and incorporated within the scope of the invention.

Of course, it should be understood that the watermark(s) and/or logo(s) may be active, video, audio, or other media content, and may have associated audio that accompanies it. Furthermore, it is understood and appreciated that audio advertising may be provided which may or may not have any relationship to the sets of information to the sets of information shown. Additional advertising or suggested terms may be shown without logical relation to the Venn diagram, and the entire background could serve as the location of an advertisement image(s), preferably embodied as watermarks.

Figure 10:
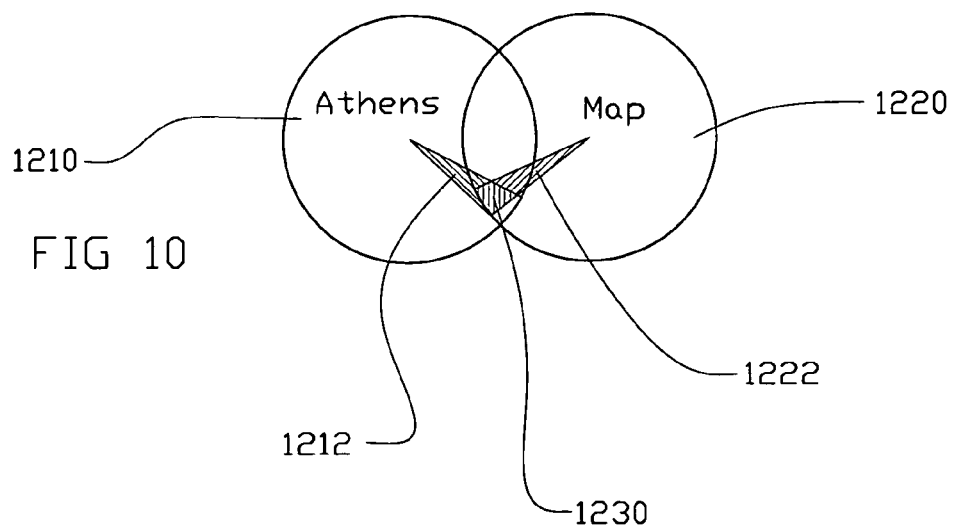
FIG. 10 shows an interactive Venn diagram illustrating species of search results.

FIG. 10 is a Venn diagram illustrating the union and intersection of a search results for the terms Athens and map. Search results of this nature may be augmented with associations, and characteristics (such as those previously discussed), for example. In general, associations "stretch" or expand the search results to provide better information to a user, typically on a similar, same or higher conceptual level as the search (for example, Athens is a city in Georgia, Alabama, Greece, and many other places), while characteristics typically dive into some sub-set or lower conceptual level of search results. For example, in FIG. 10 the search results for the terms Athens 1210 and map 1220 each have a sub-set of results that have a common characteristic illustrated as pie-slices 1212, 1222. The pie slices could be associated with a common geographical location, such as "Greece", and, although not illustrated, it will be readily apparent to those of skill in the art upon reading the disclosure that each circle 1210, 1220 could have multiple slices, each associated with a different geographic location (Alabama, Georgia, Texas, etc.), and the circles can then be rotated such that common geographic slices form an intersection 1230. Alternatively, slices could indicate the presence of PDF file types, or other file types (of which thousands are known and incorporated herein by reference). Other possible sub-sets include languages, locations, dates of up-dates, identified persons, places or things, or any other sub-set of information. Accordingly, multiple pie slices can designate access to or preference of various data clusters, and by rotating or otherwise manipulating the visual image the user can quickly gain access to the underlying preferred information, with, for example, a "double click" of a mouse. Of course, it is appreciated that although slices are illustrated in FIG. 10, any graphical representation of a sub-set of information may be utilized to provide a result to a user, such as smaller circles within the set circles, "globs", corporate logos, and/or other shapes or logos that imply information within those search results. For example, slices indicative of PDF files may incorporate the ACROBAT® software logo.

Figure 11:
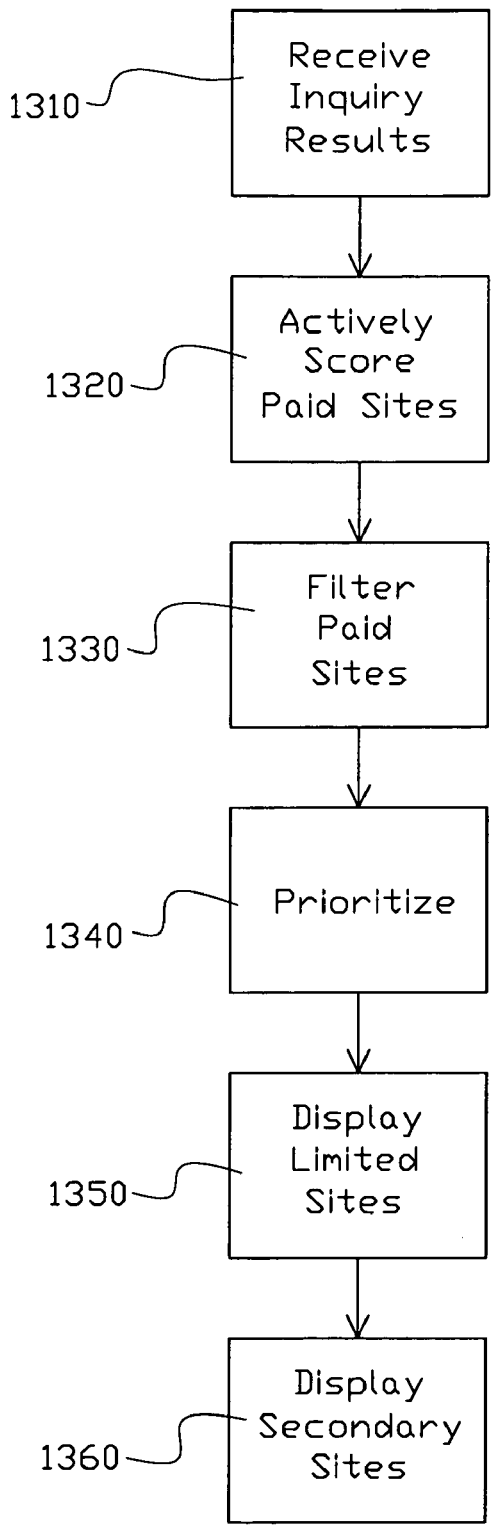
FIG. 11 is a block flow diagram of one embodiment of an advertising algorithm.

FIG. 11 illustrates an advertising delivery algorithm. The advertising delivery algorithm targets advertising to a user (in this case, also a consumer), such that the user receives and sees or hears content customized for that user. The advertising delivery algorithm, in one embodiment, begins with a receive inquiry results act 1310. In the receive inquiry results act 1310 search terms which are user generated are received by the advertising delivery algorithm. Then, in an actively scored paid sites act 1320, advertising information that is provided by an advertiser, possibly in the form of an Internet website, is scored. The paid sites may be scored as discussed above with respect to unpaid sites, and may incorporate any of a number of scoring methodologies know in the art, such as index scoring, word counts, URL scoring, "special word" scoring, link scoring, and scoring of reviewable images. Of course, it is understood that what is here described as a paid site may not necessarily be charged any money, and that a paid site is simply used as a term to indicate the site of an advertiser who may be charged for an image display or click through or order purchase or some other action on the part of a user.

Next, in a filter paid sites act 1330, the paid sites, which have preferably been scored, are filtered based on various criteria. In one embodiment, the filters are user implemented, in another embodiment the filters are provided by a plug-in from of the advertising delivery algorithm, in another embodiment the filters are generated by the advertising delivery algorithm itself, and in other embodiments standard filters are employed to prevent un-wanted content (such as adult sites). Of course, any single or combination of these and other filters may also be used to achieve filtering. For example, a consumer can enter search terms that he wishes to utilize to prevent unwanted advertising. For example, a Chevy truck enthusiast may be rather turned off by Ford advertisement, which may have very little impact other than to aggravate the Chevy truck owner. Accordingly, it is to the benefit of both the advertiser and the user to filter a Ford advertisement. Other filters and systems of filtering and methods of filtering are known in the art and may be implemented with the invention. After the paid sites have been filtered they are prioritized in a prioritize act 1340.

Preferably, prioritization is based, at least in part, on the scores generated in the actively score paid sites act. In an alternative embodiment, filtering does not necessarily eliminate sites, but rather negatively scores those sites such that prioritization is then a function of "re-scoring" the actively scored paid sites based on negative filtering scoring criteria being factored in to an overall score to generate a new score for each paid site. Following the prioritization of the paid sites, a limited number of the paid sites are displayed in a display limited sites act 1350. Preferably, the paid sites are displayed as graphics, and may be displayed as a set of results in a search result obtained in a manner discussed above. In an alternative embodiment, the systems used to score paid sites and filter paid sites are made public to allow advertisers to actively see the benefit of providing the most consumer friendly information to users and to demonstrate futility in trying to manipulate scoring. After the display limited sites act, which may display traditional links and/or descriptions, the advertising delivery algorithm may proceed to a display secondary sites act 1360.

In displaying secondary sites a user is indicating an interest in a product or service area although perhaps not in a specific product. For example, if an advertising set of travel sites is provided and a user selects that advertising set, then a subset may be generated either as a Venn diagram or as a list of specific sites (typically illustrated as links or small icons offset from the Venn diagram) which are calculated to coincide with the results the user is seeking. In one embodiment, a user is charged a fee for using the search and results service. This fee, however, may change depending upon user settings. For example, if a user allows the advertising delivery system to select advertising without filtering, then a very low fee, and perhaps no fee, is incurred on the part of the user. If, however, a user allows a pre-determined number of advertisements to appear along with any search results, then the user is charged a rate for access to the system (higher than the very low rate/no rate but lower than a full rate). For example, $9.95 a month. If, however, a user determines that they do not want to view any advertisements in the course of searching, then for a higher fee, for example $99 a month, then the user is excused from the benefit of receiving targeted advertising information.

The invention also employs inventive user verification and authentication systems. In one embodiment, a computer monitor/GUI provides a window 1400, which may fill up the entire available screen that is sub-divided into regions. In FIG. 12 a window is sub-divided into eight rows and nine columns for a total of seventy-two sub regions 1410. However, it should be understood that a window may be divided into any number of rows, any number of columns, divided into other shapes such as hexagons, or octagons, and may be divided into sections having different sized areas. Preferably, only the computer program knows such subdivision. However, in other embodiments a user is able to see the subdivision. FIG. 13 illustrates an image open in a window 1500 of a size similar to the window of FIG. 12, with a grid 1510 superimposed thereon. The image of FIG. 13 includes an image that the user sees, in this case a star 1530 with five circles 1521-1525, one circle being at each point of the star. Similarly, the window may be opened within a portion of the viewable display of the monitor, GUI, or other image device. For example, the window 1510, 1610 is illustrated as a smaller portion of a window 1600 in FIG. 14, including a star 1620. In addition, advantages may be obtained by rotating the window, moving the window such that its position dynamically changes, locating the window at different positions each time it is opened, and warping the window such that one corner is offset, all corners are offset, or that the image appears "wavy". Similarly, the sub-divisions of the window of FIG. 13 may be rotated, moved, sized, and warped (if any)

identically or similarly to the rotation, movement, warping, and so on such that the sub-divisions of FIG. 12 should consistently correspond to the same location upon the grid as indicated in FIG. 13. Then, form a high level point of view, by carefully selecting pre-determined locations of the star 1530 on the image of FIG. 13, a user may generate a much more powerful "password" than is possible using traditional analog keyboard entry systems. Of course, although a star image is illustrated in FIG. 13, it is appreciated that any image may be applicable to this system, including user selective images. In addition, in one embodiment, a user may select between multiple images that the user has designated for verification use. Accordingly, in practice, a user "clicks on" (selects) a predetermined number of locations on a displayed image. A system accepting this form of password compares the location, number, and order of clicks entered by the user to a stored location, number, and order of clicks stored by the user as a password. The system on the user machine, in practice, associates the position of the user-selection with the superimposed graph rather than the picture, which functions as a user memory prompt. If the location, number and order of clicks matches those stored, then the password is accepted.

Figure 15:
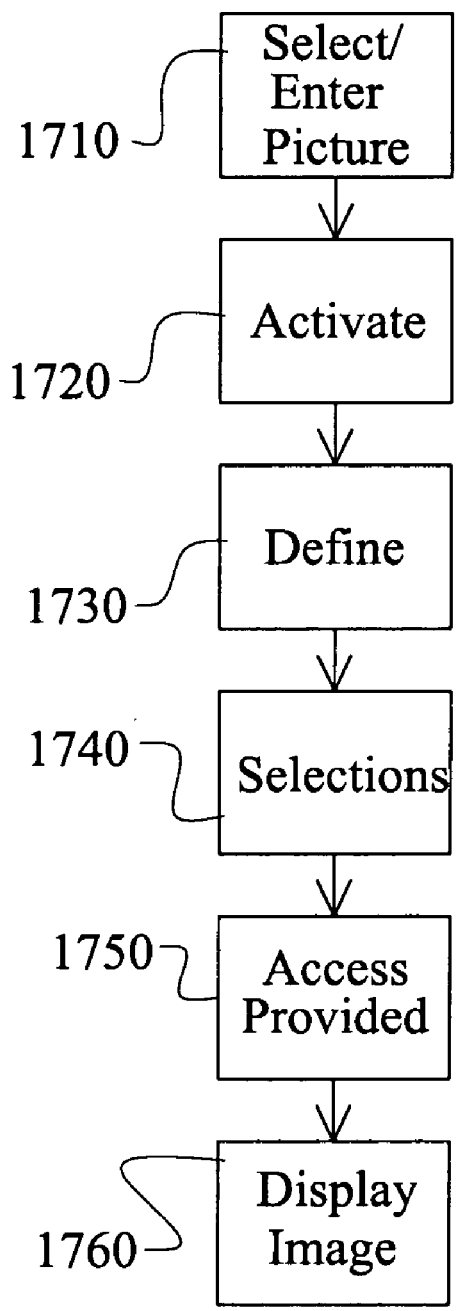
FIG. 15 is one embodiment of a password algorithm.

FIG. 15 illustrates a user verification/authentication algorithm that generates a "passpicture" (a graphical password). The algorithm begins with a select/enter-picture act 1710 in which a user selects a past picture, which has been with associated with a grid on a prior occasion. The picture may be provided by the user, a web site, or selected from a plurality of available pictures. Following the selection of the picture, that picture is in a preferred embodiment, warped, rotated, and otherwise skewed either locally via a CPU or remotely. Next, in an activate act 1720, the system receives a series of clicks or other indication of x-y choices (based on any horizontal/vertical cursor or pointer visual location system), and these choices are defined as a password in a define act 1730. Accordingly, the series of clicks by analogy are related to a series of characters of a password, and thus the series of clicks define what is known as a passpicture. As previously indicated, a user may select, for example, the eyes of three or six or seven classmates in a class photo as the passpicture. Then, those selections are associated with x-y coordinates, and within a preferably user selected tolerance for each click; these coordinates are evaluated for determination for the passpicture. Accordingly, the algorithm next, in a selections act 1740, determines whether the user input selections were appropriate, that is to say, it is determined whether the correct locations were selected, and again, in other words, whether the correct or appropriate passpicture (which may known to some as a password) was entered. If the correct passpicture or other indicia is entered, then access is provided to whatever system was protected by the past picture in an access provided act 1750. Following such access, in a preferred embodiment, a user selected image provided to a program, web site, or other source being accessed is then provided to the user to verify that the user is indeed accessing the correct program, web site, or other service in a display image act 1760.

Figure 16:
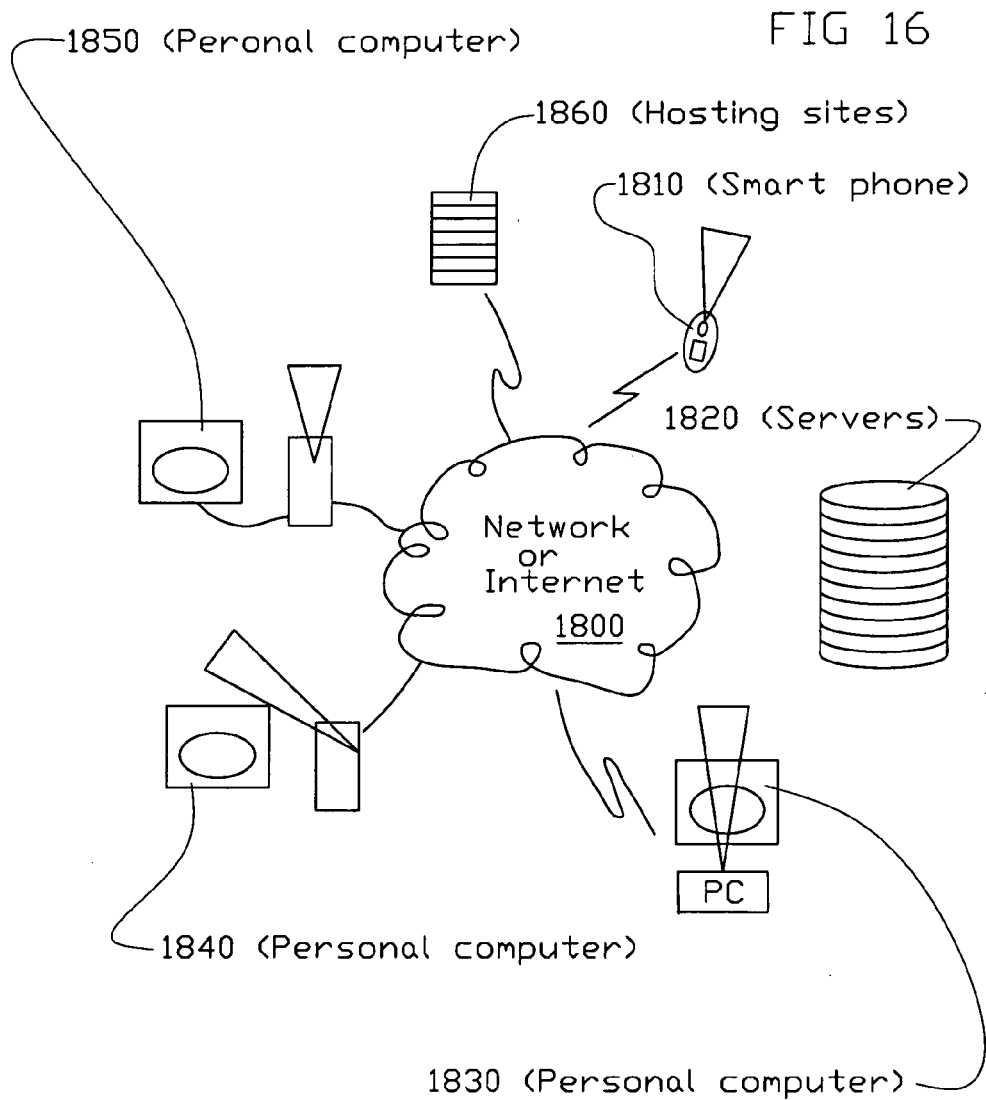
FIG. 16 illustrates a remote-indexing system.

FIG. 16 illustrates a system that incorporates remote indexing of web sites, documents, email, and other information sources. Illustrated in FIG. 16 are servers 1820 that may be provided at a search engine. Traditionally, the server (including servers or bank of servers) utilize what is known as web crawlers or other indexing tools to scan available web page images and then index those sites at the server or bank of servers of the search engine. Sometimes, web page administrators pay a fee to have their site indexed. The invention allows computing platforms such as cell phones/smart phones/PDAs 1810, personal computers 1830, 1840, 1850 and Internet hosting sites 1860 to, for example, to remotely index their own documents, data, web pages, and other information. This new concept is called self-indexing. Accordingly, in a preferred embodiment, a plug-in is provided so that users may periodically have their own web sites indexed in the background. Ideally, such systems would index data at the remote site (that is, remote from the search engine) at a time of minimal computing activity, such as, for some people, 3 a.m. However, it is not necessary that such indexing take place in the background, and users may be able to actively interact with the indexing system to more advantageously create pages that are more favorably indexed, though this is not necessarily the case. Accordingly, once data is indexed at the remote site the appropriate indexing information is sent as a "virtual crawler" to the search engine or servers at the search engine to allow for incorporation of that indexing. Of course, while servers at a search engine or bank of servers at a search engine are discussed presently, it should be understood that the indexing information may be sent to any data storage and retrieval system whether co-located or independent from any particular search engine or any particular search engine server, as the invention is limited only by the functionality discussed herein, and limited only by the claims. In addition, although a network or Internet 1800 is shown as a cloud in FIG. 16, it should be understood that the present invention is applicable to any network, intranet or Internet, including home computing systems. In addition, the invention may be implemented on a single machine having multiple processors, or a single processor that has modular functionality. Further, the data created via remote self-indexing may be used for searching data specifically at the indexed platform.

Figure 17:
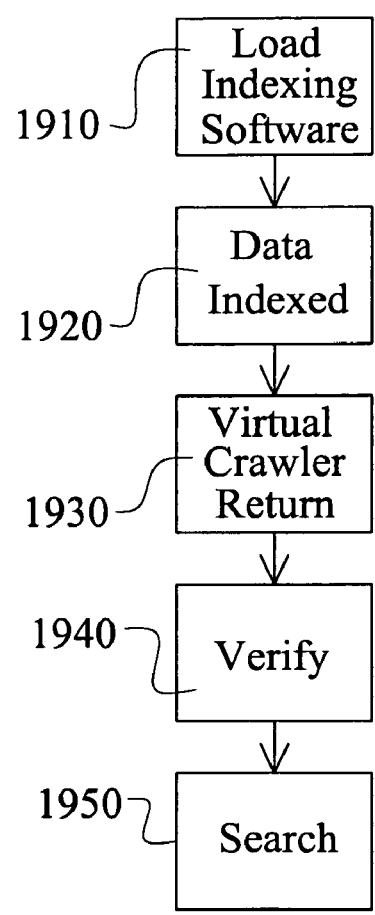
FIG. 17 is one embodiment of a remote-indexing algorithm.

FIG. 17 illustrates a remote indexing algorithm. First, in a load indexing software act 1910 the algorithm is loaded onto a computing platform remote from its search engine server, which may include an application service provider in addition to a specific computing platform such as a smart phone or PC, for example. Next, in a data indexed act 1920, the data on that particular platform or a sub-set of data on that particular platform or a sub-set of data on that particular platform is indexed in a manner pre-determined, user selected, or otherwise directed by a search engine service. Then, in a virtual crawler return act 1930 that indexed data is sent to a data storage system accessible by an Internet search engine. Accordingly, in a verify act 1940, the search engine may verify the integrity of the index data, or prompter the indexing format too reflect various scoring and result parameters which the search engine or other source wishes to implement. Then, in a search act 1950, a program implemented by the search engine or on behalf of the search engine combs through (or searches) the indexed data in response to a user query.

The invention has amazing application when utilized on small display platforms, such as phones including cell phones, smart phones, and PDAs. For example, the invention may be embodied as a commerce site having icons representing goods or services a user wants more information about. More specifically, for example, a travel site is provided having graphical-driven searching, where a hotel icon represents a hotel, a car icon represents a rental car, an airplane icon represents an airplane, a boat represents a cruse, a bus represents bus travel, a train represents train travel, a person walking represents a tour, a suitcase represents a travel package, a traditional interactive calendar, and a map allows a user to select geographic position. Of course other icons can be used to represent a great variety of information. In one embodiment, the map is interactive and is populated with city names (and/or abbreviations) and airport codes. Then, to search for appropriate schedule and pricing information, a user need only select or drag icons to a search window, along with selected calendar and location information, to easily and efficiently obtain the information that he is looking for.

Of course, it should be understood that the order of the acts of the algorithms discussed herein may be accomplished in different order depending on the preferences of those skilled in the art, and such acts may be accomplished as software. Furthermore, though the invention has been described with respect to a specific preferred embodiment, many variations and modifications (including equivalents) will become apparent to those skilled in the art upon reading the present application. It is therefore the intention that the appended claims and their equivalents be interpreted as broadly as possible in view of the prior art to include all such variations and modifications.

I claim:

1. A method, comprising:
    receiving an internet search request comprising at least a first search term and a second search term;
    accessing information stored on at least one database comprising indexed internet web pages;
    locating web pages indicated as being relevant to the search request;
    the web pages being sorted according to a first relevance score;
    displaying a first icon associated with the first search term, the first icon shown to a user as being associated with the first search term;
    displaying a second icon associated with the second search term, the second icon shown to the user as being associated with the second search term;
    receiving a user-interaction with either the first icon or the second icon; and
    the user interaction resulting in the web pages being sorted according to a second relevance score.

2. The method of claim 1 further comprising displaying an advertising graphic, the advertising graphic being associated with the first search term.

* * * * *